US011231301B2

(12) United States Patent
Ueda et al.

(10) Patent No.: US 11,231,301 B2
(45) Date of Patent: Jan. 25, 2022

(54) SENSOR DEVICE

(71) Applicant: OMRON Corporation, Kyoto (JP)

(72) Inventors: Naotsugu Ueda, Shiga (JP); Kayo Nakamura, Shiga (JP); Ryusuke Sakai, Kyoto (JP)

(73) Assignee: Omron Corporation, Kyoto (JP)

( * ) Notice: Subject to any disclaimer, the term of this patent is extended or adjusted under 35 U.S.C. 154(b) by 1011 days.

(21) Appl. No.: 15/901,824

(22) Filed: Feb. 21, 2018

(65) Prior Publication Data

US 2018/0252558 A1 Sep. 6, 2018

Related U.S. Application Data

(63) Continuation of application No. PCT/JP2016/087635, filed on Dec. 16, 2016.

(30) Foreign Application Priority Data

Mar. 3, 2016 (JP) .............................. JP2016-041292

(51) Int. Cl.
*G01D 11/24* (2006.01)
*G01K 1/08* (2021.01)

(52) U.S. Cl.
CPC ........... *G01D 11/24* (2013.01); *G01D 11/245* (2013.01); *G01K 1/08* (2013.01)

(58) Field of Classification Search
CPC ......... G01D 11/24; G01D 11/245; G01K 1/08
See application file for complete search history.

(56) References Cited

U.S. PATENT DOCUMENTS

| 10,041,818 B2* | 8/2018 | Graff ..................... G01D 11/245 |
| 2007/0157699 A1 | 7/2007 | Manlove et al. |
| 2008/0066477 A1* | 3/2008 | Aoki ................... B60H 1/00785 62/150 |
| 2010/0020849 A1* | 1/2010 | Wille ........................ G01K 1/20 374/208 |
| 2010/0112746 A1 | 5/2010 | Suzuki et al. |
| 2016/0169713 A1* | 6/2016 | Graff ................... H05K 7/20836 73/431 |
| 2019/0145834 A1* | 5/2019 | Nakamura ............... G01K 7/16 374/164 |

FOREIGN PATENT DOCUMENTS

| CN | 1908611 A | 2/2007 |
| CN | 101738222 A | 6/2010 |

(Continued)

OTHER PUBLICATIONS

Extended Search Report issued in European Application No. 16892739.0, dated Oct. 24, 2018 (8 pages).

(Continued)

*Primary Examiner* — Jamel E Williams
(74) *Attorney, Agent, or Firm* — Osha Bergman Watanabe & Burton LLP

(57) ABSTRACT

A sensor device includes a housing and a sensor component mounted in the housing. The housing has two or more vents. The sensor component is located on a path connecting two of the vents. The sensor component may include a temperature sensor, a humidity sensor, or a microphone. The sensor component may be located on a path connecting two vents in substantially facing surfaces of the housing.

9 Claims, 8 Drawing Sheets

(56) References Cited

FOREIGN PATENT DOCUMENTS

| DE | 202013104451 U1 | 11/2013 | |
|---|---|---|---|
| JP | 2006-300734 A | 11/2006 | |
| JP | 2008-064616 A | 3/2008 | |
| JP | 2014-044126 A | 3/2014 | |
| WO | 2009/139765 A1 | 11/2009 | |
| WO | WO-2009139765 A1 * | 11/2009 | ............ G01D 11/30 |
| WO | 2015/020680 A1 | 2/2015 | |

OTHER PUBLICATIONS

International Search Report issued in Application No. PCT/JP2016/087635, dated Mar. 21, 2017 (2 pages).
Written Opinion issued in Application No. PCT/JP2016/087635, dated Mar. 21, 2017 (4 pages).
Chinese Office Action in corresponding Application No. 201680044969.6 dated Aug. 2, 2019 (15 pages).

* cited by examiner

SENSOR DEVICE

BACKGROUND

Field

The present invention relates to a sensor device.

Related Art

Devices including various measurement units for obtaining biometric information about a user or environmental information about the surrounding environment have been developed (e.g., Patent Literature 1). A device described in Patent Literature 1 includes a plurality of measurement units and a plurality of notification units. Each notification unit affecting a measurement result is arranged in an area different from the area in which the corresponding measurement unit is arranged.

A resistance humidity sensor has been developed to prevent the sensing accuracy from decreasing due to the entry of water drops (e.g., Patent Literature 2).

Patent Literature 1: Japanese Unexamined Patent Application Publication No. 2006-300734

Patent Literature 2: Japanese Unexamined Patent Application Publication No. 2008-64616

SUMMARY

A sensor product carried by a user for obtaining information about the surrounding environment can have its sensor components in a housing to reduce disturbance factors. However, when sealed in a housing, sensor components that measure the dynamic physical quantities of outside air, such as temperature, humidity, and acoustic pressure, can have lower responsiveness and accuracy.

One or more aspects of the present invention are directed to a sensor device that achieves responsiveness and accuracy in a well-balanced manner with portability.

A sensor device according to an aspect of the present invention including a housing, and a sensor component mounted in the housing. The housing has two or more vents. The sensor component is located on a path connecting two of the vents.

This structure facilitates exchange of air between the outside and the inside of the sensor device or particularly the area around the sensor component, thus preventing the sensor device including the sensor component in the housing from having lower responsiveness or measurement accuracy. In other words, the sensor device achieves responsiveness and accuracy in a well-balanced manner with portability.

The sensor component may include a temperature sensor, a humidity sensor, or a microphone. In particular, the exchange of air between the outside and the area around such sensor components that measure the dynamic physical quantities of outside air prevents the sensor components from having lower responsiveness or measurement accuracy.

The sensor component may be located on a path connecting the two vents in substantially facing surfaces of the housing. This structure can reduce air stagnant inside the sensor device and facilitate exchange of air between the outside and the inside of the sensor device.

The housing may contain a substrate on which the sensor component is mounted. The substrate may include a fixture that fixes the substrate to the housing and a tongue piece extending from the fixture. The sensor component may include a temperature sensor, and may be located on the tongue piece. This structure can reduce heat conduction to the tongue piece, and the temperature sensor has an output less susceptible to heat.

The fixture may be located at an end of the substrate. The tongue piece may have an edge that is at least partially defined by a slit in the substrate. In this structure, the tongue piece has its perimeter partially defined by an end of the substrate. The substrate has its effective area less likely to decrease due to the slit.

The sensor device may further include a motion sensor that measures at least one of acceleration and angular velocity, and a component having a higher rigidity than the substrate between the fixture and the motion sensor. This structure prevents vibrations of the tongue piece from affecting an output of an acceleration sensor.

The sensor component may include a temperature sensor, and the substrate may be substantially rectangular and have two substantially diagonally opposite ends on one of which the temperature sensor is located and the other one of which a component having highest heat generation is located. This structure prevents the component with high heat generation from affecting an output of the temperature sensor.

The aspects in the solution to problem section may be combined in any manner without departing from the purpose or technical idea of the present invention.

The sensor device according to the above aspects achieves responsiveness and accuracy in a well-balanced manner with portability.

DETAILED DESCRIPTION

A multiplex sensor according to one or more embodiments of the present invention will now be described with reference to the drawings. The multiplex sensor according to the embodiments described below is one example, and is not limited to the structure described below.

Housing

Figure 1:
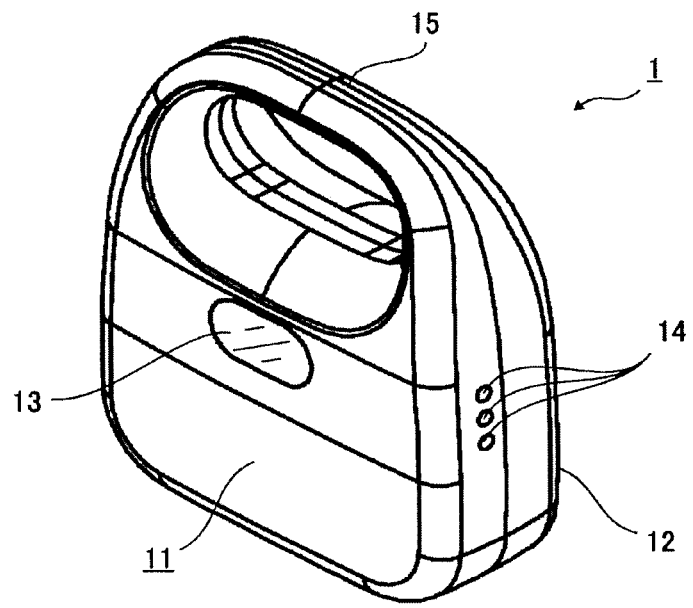
FIG. 1 is a perspective view of an example sensor device.
Figure 2:
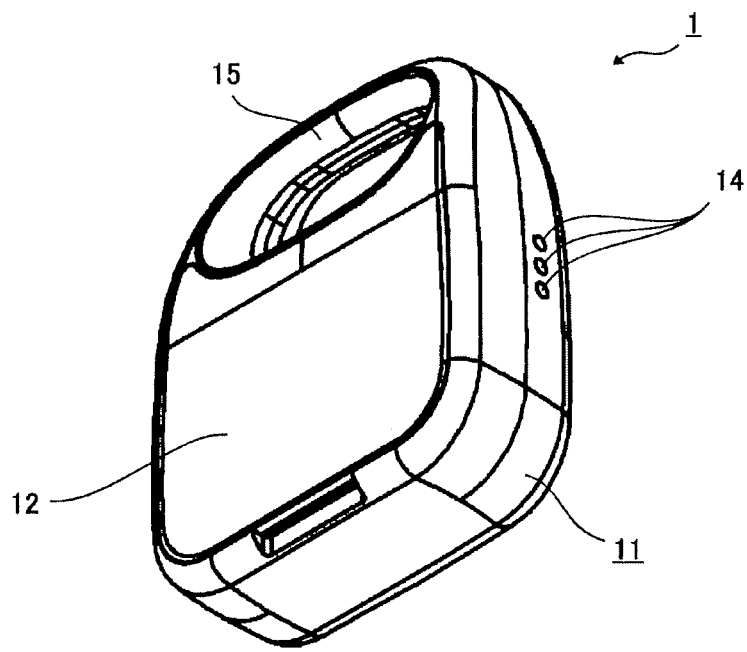
FIG. 2 is a perspective view of the example sensor device.
Figure 3:
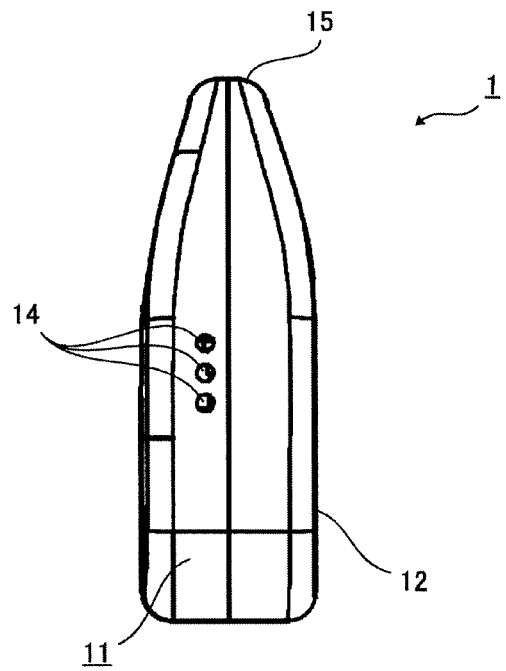
FIG. 3 is a right side view of the sensor device.
Figure 4:
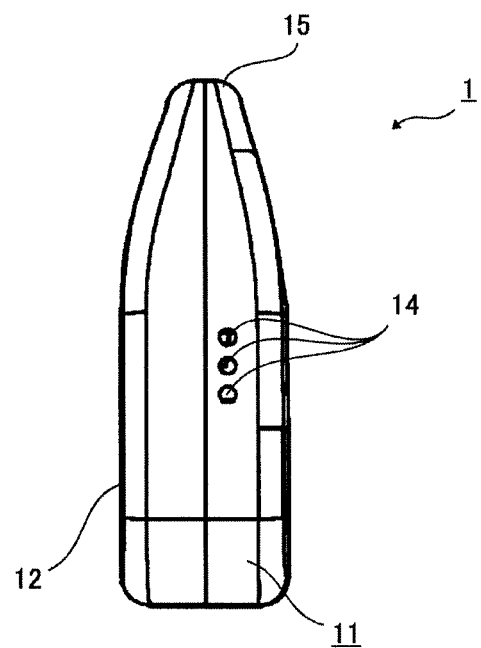
FIG. 4 is a left side view of the sensor device.

FIG. 1 is a perspective view of a sensor device 1 according to the present embodiment as its front is viewed from the upper right. FIG. 2 is a perspective view of the sensor device 1 as its back is viewed from the lower left. FIG. 3 is a right side view of the sensor device 1. FIG. 4 is a left side view of the sensor device 1. The sensor device 1 is a general-purpose device that measures information about a surrounding environment. The sensor device 1 contains various sensor components. The sensor components include semiconductor packages containing sensor elements, and integrated circuits (ICs) for signal processing. The sensor device 1 may be capable of wireless communication, and may be used for watching the elderly or children. The sensor device 1 may be also referred to as a multiplex sensor.

The sensor device 1 includes a housing body 11 and a battery cover 12. The housing body 11 and the battery cover 12 are formed from, for example, a resin.

The housing body 11 has a front window 13, which is formed from a transparent resin. The window 13 is formed from, for example, acryl or polycarbonate (PC). The housing body 11 may further contain a display, such as a light emitting diode (LED), viewable through the window 13, and an illuminance sensor or an ultraviolet (UV) sensor reachable by external light through the window 13.

The housing body 11 has vents 14 in its side surfaces. As shown in FIGS. 3 and 4, the housing body 11 according to the present embodiment has three vents 14 in each of its right and left side surfaces. The vents 14 in one side surface are positioned and sized symmetrical to the vents 14 in the other side surface. The vents 14 are through-holes in the housing. The sensor device 1 may include sensors that function when exposed to outside air, such as a temperature sensor, a humidity sensor, an absolute pressure sensor (atmospheric pressure sensor), and a microphone. The vents 14 facilitate exchange of air between the outside and the inside of the sensor device 1, allowing the above sensors installed inside the housing to be highly responsive. The vents 14 may be covered with a moisture permeable and waterproof sheet placed inside the housing body 11. This allows the sensor device 1 to have practical water proof capability and increase convenience for the user carrying and using the sensor device. The moisture permeable and waterproof sheet is also windproof, and reduces noise caused by wind affecting an absolute pressure sensor 165 and a temperature-humidity sensor 162.

The housing body 11 has an upper handle 15. The handle 15 is an annular grip, which can be hung from a bag or a baby buggy to allow a user to carry the housing body 11. The handle 15 may not be annular, but may have another shape, or for example may have the same topology as a torus or may be a hook.

Figure 5:
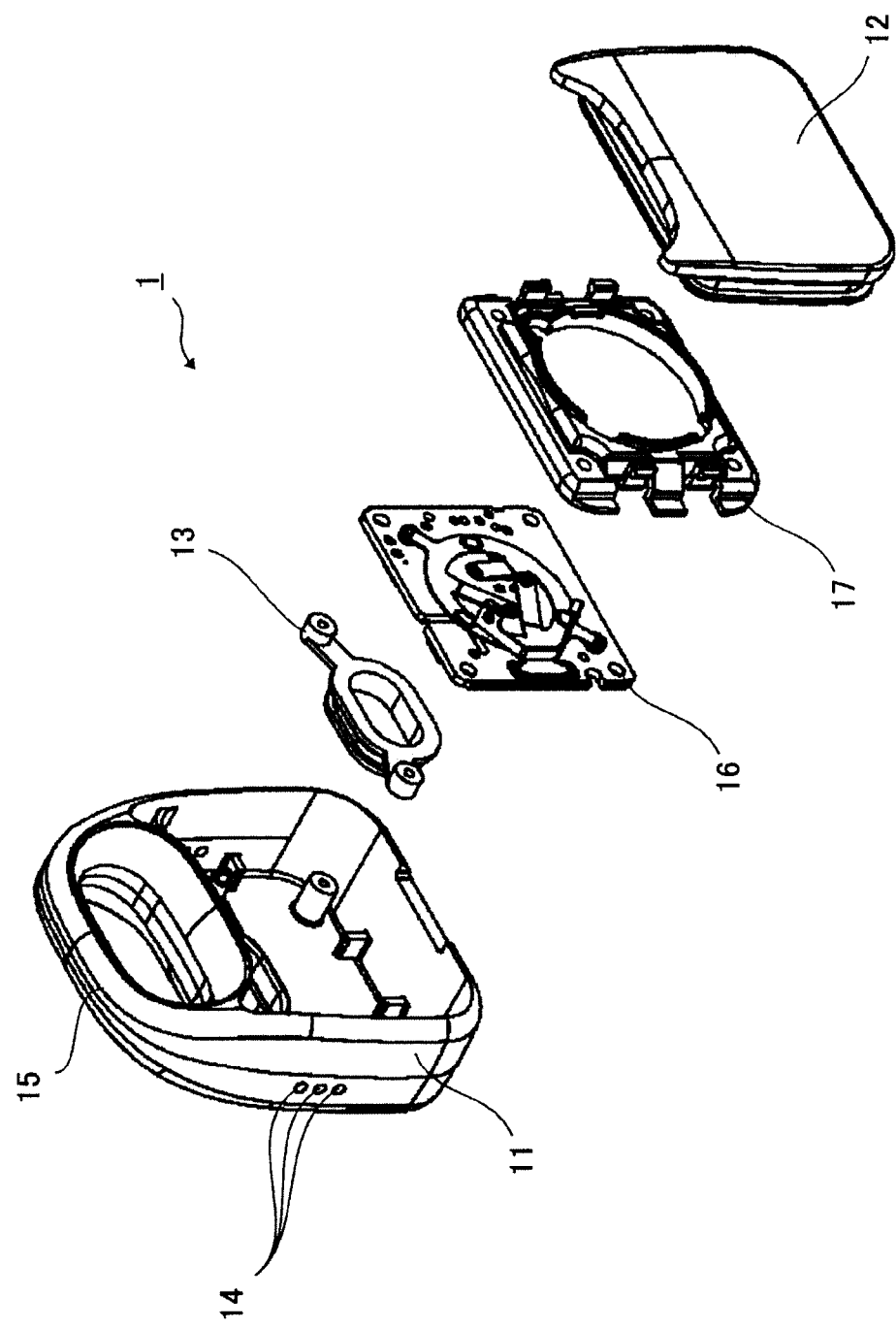
FIG. 5 is an exploded perspective view of the sensor device.

FIG. 5 is an exploded perspective view of the sensor device 1 showing the internal structure as its back is viewed from the upper right. The sensor device 1 contains a substrate 16 and an inner cover 17. The substrate 16 is an electronic circuit substrate on which various sensor components are mountable. The inner cover 17, when combined with the substrate 16, defines a battery box for holding a button battery on the substrate 16. The window 13 defines a wall surface in the sensor device 1 substantially along its rim. The window 13, when combined with the substrate 16, defines a room containing a display including an LED, an illuminance sensor, and a UV sensor. Also, the window 13 and the battery cover 12 each have a packing such as an O-ring to seal their joints with the housing body 11.

Figure 6:
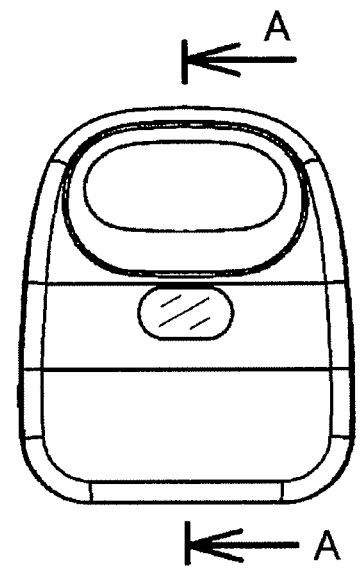
FIG. 6 is a front view of the sensor device.
Figure 7:
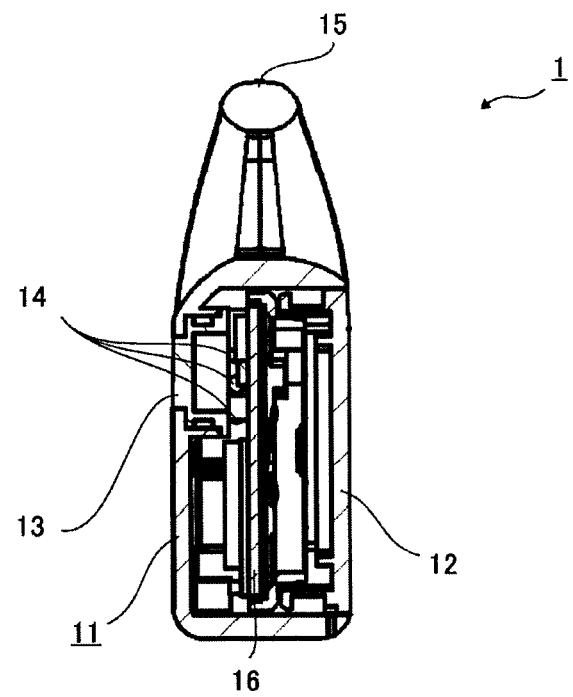
FIG. 7 is a cross-sectional view of the sensor device taken along line A-A in FIG. 6.

FIG. 6 is a front view of the sensor device 1. FIG. 7 is a cross-sectional view taken along line A-A in FIG. 6. The cross-section along line A-A is the cross-section of the sensor device 1 along its lateral center as viewed from the right toward the front of the sensor device 1 shown in FIG. 6. As shown in FIG. 7, the vents 14 are formed in either of two compartments divided by the substrate 16 in the sensor device 1. The vents 14 are at positions overlapping the components that are mounted on the substrate 16 as viewed laterally.

Substrate

Figure 8:
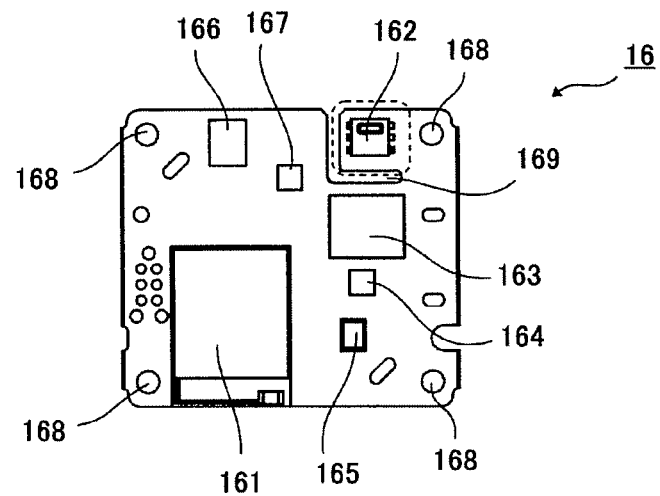
FIG. 8 is a schematic diagram showing components mounted on a substrate.

FIG. 8 is a schematic diagram showing the arrangement of components mounted on the surface of the substrate 16. Although the components are mounted on one side of the substrate in the present embodiment, the components may be mounted on both sides of the substrate. The substrate 16 includes a wireless module 161, a temperature-humidity sensor 162, a flash memory 163, a motion sensor 164, an absolute pressure sensor 165, a microphone 166, a component 167 including an illuminance sensor, a UV sensor, and an LED, housing fixtures 168, and a slit 169.

The wireless module 161 is a communication unit that transmits or receives data in accordance with the standards such as Bluetooth (registered trademark), a wireless local area network (LAN), or other mobile data communication. The wireless module 161 communicates with, for example, a mobile phone or a smartphone carried by a user, and transmits measured data. The wireless module 161 is a component that generates a relatively large amount of heat in normal use, among other components mounted on the sensor device 1 according to the present embodiment.

Figure 9:
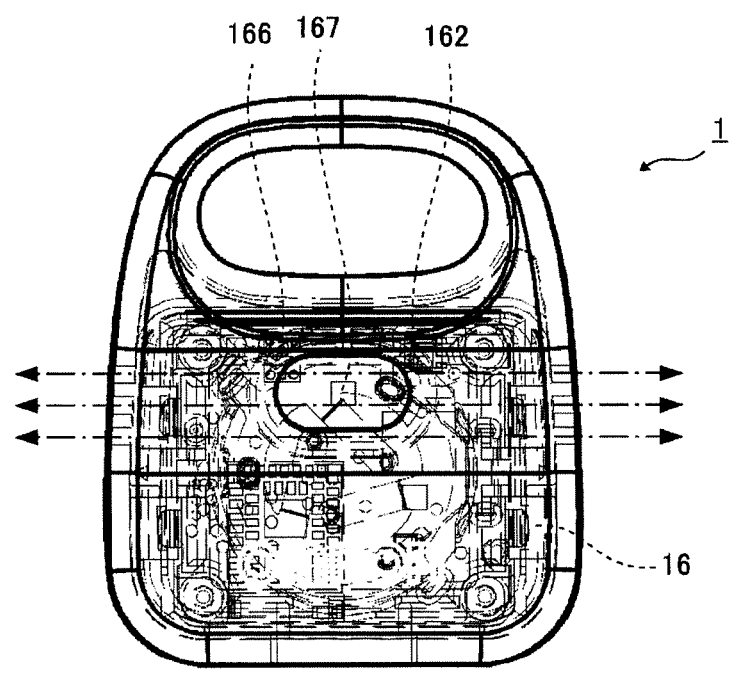
FIG. 9 is a diagram showing paths connecting vents in the right and left side surfaces of the sensor device.

The temperature-humidity sensor 162 is a component including a temperature sensor and a humidity sensor mounted on a single chip. The temperature sensor and the humidity sensor measure the dynamic physical quantities of outside air, and function when exposed to outside air. As shown in FIG. 9, the temperature-humidity sensor 162 is arranged on paths connecting the vents 14 in the right and left side surfaces of the sensor device 1 in the present embodiment. In FIG. 9, the chain lines indicate the paths connecting the vents 14 in the right and left side surfaces, the dashed line indicates the substrate 16 contained in the sensor device 1, and the thin solid lines indicate the components mounted on the substrate 16. As shown in FIG. 9, the temperature-humidity sensor 162 is arranged on the paths connecting the vents 14 in the right and left side surfaces. This facilitates exchange of air between the surrounding area and the outside of the temperature-humidity sensor 162, and prevents the sensor device 1 including the temperature-humidity sensor 162 contained in the housing from having lower responsiveness.

The flash memory 163 is a storage for values measured by the sensors. The flash memory 163 according to the present embodiment is more rigid than the substrate 16. The flash memory 163 uses a relatively large mounting area.

The motion sensor 164 measures at least one of the acceleration and the angular velocity detected by the sensor. More specially, the motion sensor 164 may be any sensor selected from a sensor for measuring an acceleration for each of three axes, a sensor including a gyro sensor for measuring an angular velocity for each of three axes, a sensor including a triaxial gyro sensor and a geomagnetic sensor for measuring the posture for each of three axes, and a sensor including three sensors or an acceleration sensor, a gyro sensor, and a geomagnetic sensor for each of three axes, or a combination of these sensors. The acceleration sensor may use a capacitance detecting method, a piezo resistive method, or a heat sensing method. The measurement may use any method. Similarly, the gyro sensor may use a vibration method using a piezoelectric vibrator and a silicon vibrator. The geomagnetic sensor may use a magneto-resistive (MR) device, a magneto-impedance (MI) device, or a Hall device.

The absolute pressure sensor 165 measures the atmospheric pressure detected by the sensor. The absolute pressure sensor 165 measures the absolute pressure based on absolute vacuum. The measurement may use any method. The sensor device 1 according to the present embodiment is not hermetically sealed, and thus the absolute pressure sensor 165 can function sufficiently independently of its position on the substrate 16.

The microphone 166 detects the acoustic pressure. In the present embodiment, the microphone 166 is arranged on the paths connecting the vents 14 in the right and left side surfaces of the sensor device 1. The microphone 166 is thus highly responsive, in the same manner as the temperature-humidity sensor 162.

The component 167 including an illuminance sensor, a UV sensor, and an LED is a set of an illuminance sensor, a UV sensor, and an LED mounted on a single chip. The illuminance sensor measures the illuminance indicating the brightness of light. The UV sensor measures the ultraviolet quantities. The LED is a display that lights up, blinks, and changes its color in accordance with the operation status of the sensor device 1, the data measured by each sensor chip, and other information. The display may be a seven-segment display that can display numbers. The illuminance sensor and the UV sensor are to be exposed to external light, and thus are arranged at positions reachable by external light entering through the window 13. The LED is arranged at a position viewable by the user through the window 13. More specially, the component 167 including the illuminance sensor, the UV sensor, and the LED is arranged at a position overlapping the window 13 as viewed from the front of the sensor device 1.

Figure 10:
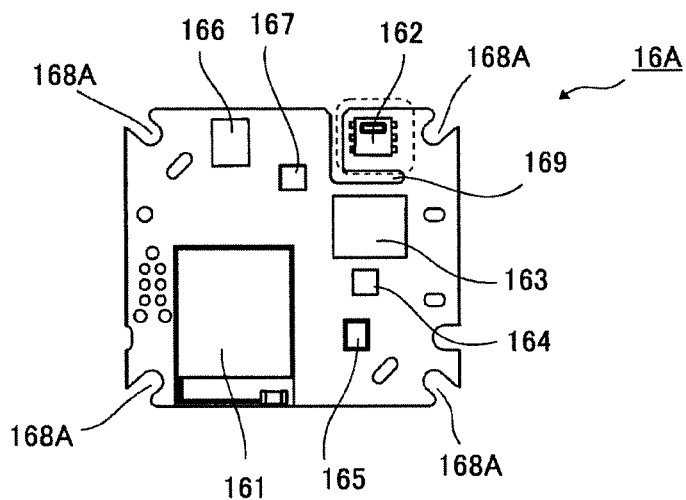
FIG. 10 is a diagram showing a substrate according to another example.
Figure 11:
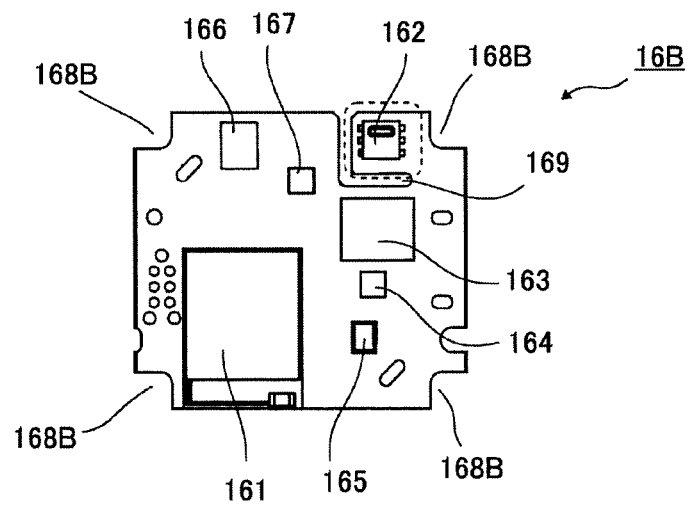
FIG. 11 is a diagram showing a substrate according to still another example.

The housing fixtures 168 are used to fix the substrate 16 to the housing body 11. In the example shown in FIG. 8, the housing fixtures 168 are threaded holes in the four corners of the substrate 16. The housing fixtures 168 may not be threaded holes. FIG. 10 is a diagram showing a substrate according to another example. FIG. 10 shows a substrate 16A including housing fixtures 168A. The housing fixtures 168A are rounded rectangular notches at the four corners of the substrate 16A, each of which is defined by parallel lines extending inward and a semicircle. FIG. 11 is a diagram showing a substrate according to another example. FIG. 11 shows a substrate 16B including housing fixtures 168B. The housing fixtures 168B are rounded rectangular notches at the four corners of the substrate 16B, each of which is defined by sides parallel to the corresponding sides of the substrate. The substrate 16 with any of the structures shown in FIGS. 10 and 11 may be fixed to the housing body 11 with screws. The substrate 16 may not be fixed to the housing body 11 with screws, but may be fixed to the housing body 11 with engagements between the substrate 16 and tabs on the housing body 11, or by swaging using heat.

The slit 169 surrounds a part with the temperature-humidity sensor 162. The part with the temperature-humidity sensor 162 is a tongue piece protruding from one housing fixture 168 in one direction. For ease of explanation, the tongue piece may refer to a part surrounded by a rounded square drawn with a dashed line in FIG. 8. The substrate 16 is formed from, for example, a glass epoxy material with relatively high heat conductivity. The temperature sensor may have an output affected by heat generation in other parts on the substrate 16. A wiring pattern on the substrate 16 (not shown) also conducts the heat. The slit 169 cuts the heat conduction on the substrate 16.

Figure 12:
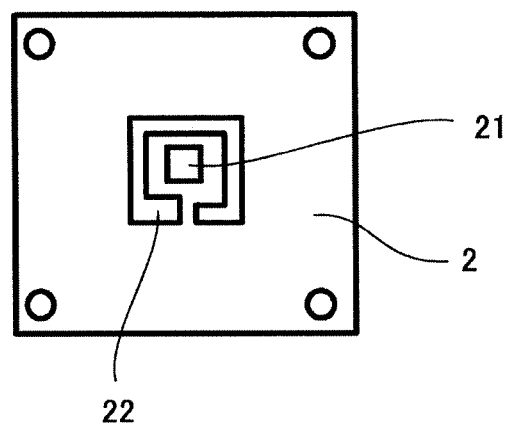
FIG. 12 is a diagram describing a substrate according to a comparative example.
Figure 13:
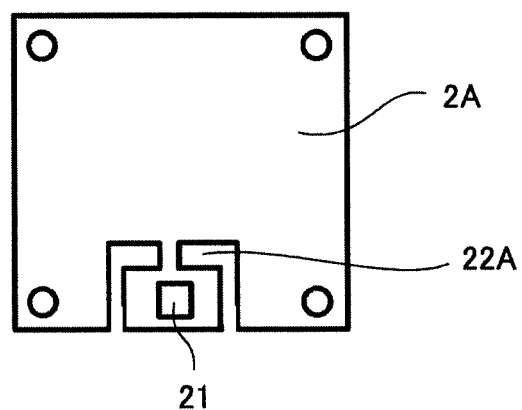
FIG. 13 is a diagram describing a substrate according to another comparative example.

FIG. 12 is a diagram describing a substrate 2 according to a comparative example. The substrate 2 in FIG. 12 includes a temperature sensor 21 and a slit 22 surrounding the temperature sensor 21. The temperature sensor 21 is arranged in substantially the middle of the substrate 2, and is surrounded by the slit 22. A part of the substrate 2 with the temperature sensor 21 is connected to the entire substrate at one point. FIG. 13 is a diagram describing a substrate 2A according to another comparative example. The substrate 2A in FIG. 13 includes a temperature sensor 21 and a slit 22A. The temperature sensor 21 is arranged in substantially the middle on one side of the rectangular substrate 2A, and is surrounded by the slit 22A. A part of the substrate 2A with the temperature sensor 21 is connected to the entire substrate at one point. In the example shown in FIG. 13, the temperature 21 is arranged on the end part of the substrate 2A, and thus the slit is shorter than in the example shown in FIG. 12.

For easy processing, the slit typically has a width substantially equivalent to the thickness of the substrate. When the temperature sensor 21 is arranged in the middle of the substrate as shown in FIG. 12, or the temperature sensor 21 is arranged in substantially the middle on one side at the end of the substrate as shown in FIG. 13, the substrate can have a smaller effective area than in the structure according to the present embodiment shown in FIG. 8. In other words, the slit surrounding the temperature sensor reduces the effective area of the substrate, and limits the area in which components are mountable and also limits the wiring pattern. The structure shown in FIG. 8 according to the present embodiment includes the temperature-humidity sensor 162 located near one corner of the substrate 16. In this structure, ends of the substrate 16 can replace two of the four side slits surrounding substantially the four sides of the temperature sensor 21 in the example shown in FIG. 12. Although placing a wiring pattern around the housing fixtures 168 is typically difficult, the temperature-humidity sensor 162 near the housing fixtures 168 can prevent the effective area of the substrate from decreasing. With no wiring pattern surrounding the temperature-humidity sensor 162, this structure reduces heat conduction caused by the wiring pattern. When the housing fixtures 168 are threaded holes, metal screws allow more efficient escape of heat to the housing body 11.

Modifications of Housing

Figures 14A, 14B, 14C:
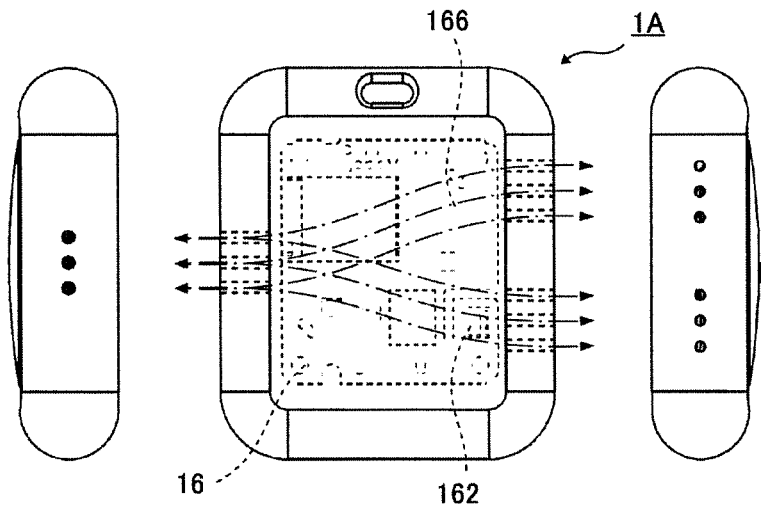
FIGS. 14A to 14C are diagrams showing a sensor device according to a modification.

FIGS. 14A to 14C are diagrams of a sensor device 1A according to a modification. FIG. 14A is a right side view, FIG. 14B is a front view, and FIG. 14C is a left side view of the sensor device 1A. The front view shows a dashed line indicating the substrate 16 in the sensor device 1A. Although the substrate 16 is identical to the structure shown in FIG. 8, the substrate 16 in the sensor device 1A has rotated to the right by 90 degrees from the example shown in FIG. 9. As shown in the right side view and the left side view of the sensor device 1A, the right and left vents 14 are at positions that do not overlap as viewed laterally in FIGS. 14A and 14C. The sensor device 1A including the temperature-humidity sensor 162 and the microphone 166 on the paths connecting the right and left vents as indicated by the arrows drawn with chain lines in the front view are highly responsive.

Figures 15A, 15B, 15C:
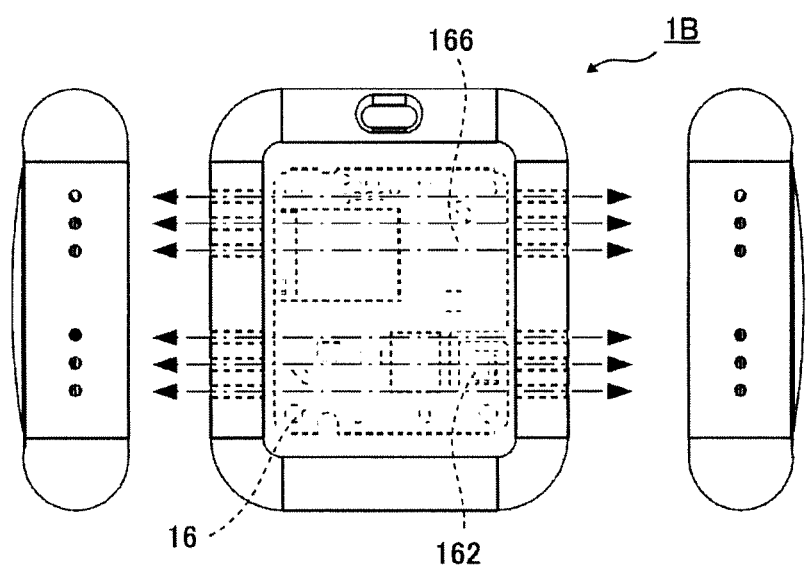
FIGS. 15A to 15C are diagrams showing a sensor device according to another modification.

FIGS. 15A to 15C are diagrams of a sensor device 1B according to another modification. FIG. 15A is a right side view, FIG. 15B is a front view, and FIG. 15C is a left side view of the sensor device 1B. The front view shows a dashed line indicating the substrate 16 in the sensor device 1B. Although the substrate 16 in FIG. 15B is also identical to the structure shown in FIG. 8, the substrate 16 in the sensor device 1B has rotated to the right by 90 degrees from the example shown in FIG. 9. In the front view, the arrows drawn with chain lines indicate the paths connecting the right and left vents 14. As shown in FIGS. 14A to 14C and in FIGS. 15A to 15C, the sensor device including the temperature-humidity sensor 162 and the microphone 166 arranged on the paths connecting the vents is highly responsive. The structure may have any number of vents at any positions. As shown in FIGS. 15A to 15C, more vents 14 may be provided in a wider range in each side surface. This further facilitates exchange of air between the outside and the inside of the sensor device 1. Although the vents 14 are formed in the side surfaces in the above embodiments and modifications, the structure may have the vents 14 in, for example, surfaces that do no face each other, such as a side surface and a bottom surface. However, the vents in the surfaces facing each other as in the above embodiments and modifications can reduce air stagnant inside the sensor device.

Advantages

The sensor device according to the embodiments of the present invention includes sensor components that measure the dynamic physical quantities of outside air, such as a temperature sensor, a humidity sensor, and a microphone, on the paths connecting the vents. This sensor device including the sensor components mounted in the housing is prevented from having lower responsiveness or measurement accuracy, and also is highly portable and less susceptible to disturbance factors to improve measurement accuracy. In particular, the sensor device including the vents in the substantially facing (opposite) surfaces reduces air stagnant inside the sensor device and facilitates exchange of air between the outside and the inside of the sensor device.

The sensor device contains the substrate that divides its device internal space into two compartments. The sensor devices has the vents in the compartment for containing the above sensor components, and the battery box defined in the other compartment. This structure reduces heat (or energy loss) generated by power supply components from affecting the temperature sensor.

The substrate allows the temperature sensor to be located away from a component that generates a large amount of heat in normal use to prevent the component with high heat generation from affecting an output of the temperature sensor. In the above embodiment, the wireless module 161 includes a processor (central processing unit, or CPU) and thus generates a largest amount of heat in normal use. The substrate is substantially rectangular and has two substantially diagonally opposite ends, on one of which the component with high heat generation is arranged and the other one of which the temperature sensor is arranged to prevent the component with high heat generation from affecting an output of the temperature sensor.

The substrate further includes the slit around the temperature sensor. The slit cuts heat conduction and prevents heat generated by the components in the sensor device from affecting the temperature sensor. In the above embodiment, the substrate includes the fixtures to fix the substrate to the housing near the corners of the substrate, and the slit extending from one of the fixtures in one direction to define the tongue piece, on which the temperature sensor is arranged. This structure prevents the effective area of the substrate from decreasing and reduces heat conduction to the temperature sensor. The fixtures may use metal screws to allow more efficient escape of heat to the housing.

When a motion sensor is mounted on the substrate, the tongue piece may easily vibrate and affect an output of the motion sensor. In the present embodiment, the tongue piece extends from the fixture to have less vibrations transmitted to the motion sensor. Any component that reduces vibrations of the substrate, such as a component with a relatively large mounting area or a component with higher rigidity than the substrate 16 may be mounted between the fixture and the motion sensor on the substrate to reduce noise received by the motion sensor. The component arranged between the fixture and the motion sensor may have a size that at least covers one-third (or in some embodiments one-half) of the distance from the tongue piece to the motion sensor (or more specifically, the distance from the fixture located at the joint of the tongue piece to the motion sensor). In the example shown in FIG. 8, a flash memory is mounted between the housing fixture 168 and the motion sensor 164 on the substrate. The flash memory has higher rigidity than the substrate 16 and covers one-half or more of the distance from the housing fixture 168 to the motion sensor 164.

Some or all of the components in the above embodiments and modifications may be combined in use. For example, either one of the temperature-humidity sensor 162 or the microphone 166 may be arranged on the paths connecting the vents, or any other sensor component not described in the above embodiments or modifications may further be arranged on the paths connecting the vents.

REFERENCE SIGNS LIST 1 sensor device
2 substrate
11 housing body
12 battery cover
13 window
14 vent
15 handle
16 substrate
17 inner cover
161 wireless module
162 temperature-humidity sensor
163 flash memory
164 motion sensor
165 absolute pressure sensor
166 microphone
167 LED
168 housing fixture
169 slit

The invention claimed is:

1. A sensor device, comprising:
a housing having at least two vents; and
a sensor component mounted in the housing,
wherein the sensor component is located on a path connecting two of the vents,
wherein the housing contains a substrate on which the sensor component is mounted,
wherein the substrate includes a fixture that fixes the substrate to the housing and a tongue piece extending from the fixture, and
wherein the sensor component includes a temperature sensor or a humidity sensor, and is located on the tongue piece, and
the sensor device further comprising:
a motion sensor configured to measure at least one of acceleration and angular velocity; and a component having a higher rigidity than the substrate between the fixture and the motion sensor.

2. The sensor device according to claim 1, wherein the sensor component includes a temperature sensor, a humidity sensor, or a microphone.

3. The sensor device according to claim 1, wherein the sensor component is located on a path connecting two of the vents in substantially facing surfaces of the housing.

4. The sensor device according to claim 1, wherein the fixture is located at an end of the substrate, and wherein the tongue piece has an edge that is at least partially defined by a slit in the substrate.

5. The sensor device according to claim 1, wherein the sensor component includes a temperature sensor, and wherein the substrate is substantially rectangular and has two substantially diagonally opposite ends on one of which the temperature sensor is located and the other one of which a component having highest heat generation is located.

6. The sensor device according to claim 2, wherein the sensor component is located on the path connecting the two of the vents in substantially facing surfaces of the housing.

7. The sensor device according to claim 2, wherein the sensor component includes a temperature sensor, and wherein the substrate is substantially rectangular and has two substantially diagonally opposite ends on one of which the temperature sensor is located and the other one of which a component having highest heat generation is located.

8. The sensor device according to claim 3, wherein the sensor component includes a temperature sensor, and wherein the substrate is substantially rectangular and has two substantially diagonally opposite ends on one of which the temperature sensor is located and the other one of which a component having highest heat generation is located.

9. The sensor device according to claim 4, wherein the sensor component includes a temperature sensor, and wherein the substrate is substantially rectangular and has two substantially diagonally opposite ends on one of which the temperature sensor is located and the other one of which a component having highest heat generation is located.

* * * * *